United States Patent [19]

Rowland-Hill

[11] 4,328,815

[45] May 11, 1982

[54] DIVIDER FEED MEANS FOR AXIAL FLOW COMBINE

[75] Inventor: E. William Rowland-Hill, Lancaster, Pa.

[73] Assignee: Sperry Corporation, New Holland, Pa.

[21] Appl. No.: 251,573

[22] Filed: Apr. 6, 1981

[51] Int. Cl.$^3$ .............................................. A01F 12/10

[52] U.S. Cl. .................................................. 130/27 T

[58] Field of Search .............. 130/27 T, 27 R, 27 AB; 56/14.6

[56] References Cited

U.S. PATENT DOCUMENTS

| | | | |
|---|---|---|---|
| 4,087,953 | 5/1978 | Wilson et al. | 56/14.6 |
| 4,177,821 | 12/1979 | Peiler et al. | 130/27 T |
| 4,209,024 | 6/1980 | Powell et al. | 130/27 T |

*Primary Examiner*—Jay N. Eskovitz

*Attorney, Agent, or Firm*—C. Hercus Just; Frank A. Seemar; Larry W. Miller

[57] ABSTRACT

An axial flow combine having a forward elevating conveyor leading to the feeder house in which beating rotors coact with stationary concave grates and also includes augers on the forward ends of the rotors to insure positive feed of crop material from the elevating conveyor to the rotors. The invention includes feed divider vanes extending in the direction of feed of the crop material from the elevating conveyor to the rotors and are fixedly positioned upon a ramp extending beneath the augers to divide the oncoming material fed to each auger into two streams to minimize the tendency for the material, such as tough long straw experienced in rice, to be formed into spiral rope-like configurations incident to being transformed from linear feed direction by the elevating conveyor to lateral spiral motion, caused by the augers, for delivery between the rotors and grates for threshing the material.

7 Claims, 5 Drawing Figures

10
24
2
28
22
26
18
16
2
30
14
12
20

22
28
28
24
24
38
38
3
3
20
40
34
40
34
32
36
32
36
18
30

26
26
44
44
40
40
32
32
28
28
34
34
4
4
22
22
30
20

5
5
20
28
28
32
40
30
34
42

30
34
40
42
46
48

DIVIDER FEED MEANS FOR AXIAL FLOW COMBINE

BACKGROUND OF THE INVENTION

This invention pertains to axial flow combines in which a header is provided on the forward end of a mobile combine to cut and consolidate agricultural material to be delivered to threshing rotors and concaves in combines by means of an elevating conveyor extending between the header and the forward ends of the threshing means. The elevator delivers the cut material longitudinally upwardly and rearwardly to the forward end of the rotors and concaves. The elevating movement is in a longitudinal direction, while the rotors move the material laterally relative to the longitudinal feed direction and in tough long straw conditions, such as rice, tend to twist the material into spiral, somewhat rope-like configurations, which tend to render the operation of the threshing apparatus more burdensome and difficult because of such spiral configurations of the material.

In the preferred form of the invention, the forward ends of the rotors also are provided with augers to facilitate the feeding of the material from the delivery end of the elevating conveyor to the forward ends of the rotors which are in the nature of bearing rotors, and the concaves are in the form of concave grates, having ribs and perforations of conventional type. The provision of such augers, whether of uniform diameter or conical, accentuates the problem of the change in feeding direction from longitudinal to lateral, or spiral, forming the material into twisted or spiral rope-like configurations. This problem exists in many types of axial flow combines currently in use and developed heretofore. Certain attempts have been made to solve the aforementioned problem, as exemplified in the following prior U.S. patents:

U.S. Pat. No. 4,087,953, to Wilson et al, dated May 9, 1978, discloses an axial flow combine in which an upwardly and rearwardly extending auger is employed instead of an endless elevator type of conveyor, and a feeder beater having a transverse axis adjacent the inlet end of the auger appears to assist in spreading out the material delivered to the auger which, in turn, delivers the material to the inlet end of the rotor of the combine.

U.S. Pat. No. 4,177,821, to Peiler et al, dated Dec. 11, 1979, also uses an auger elevating member similar to that in the Wilson et al patent, discussed above, and in an effort to somewhat disintegrate the material delivered from the upper end of the auger to the rotor, the forward end of the rotor is provided with rows of spaced angular vanes circumferentially spaced around the exterior of the inlet end of the rotor, as well as along the main body thereof in an effort to spread out the material as it is engaged by the rotor.

U.S. Pat. No. 4,209,024, to Powell et al, dated June 24, 1980, shows an axial flow combine more similar to the present invention than the above discussed patents, and in which an endless conveyor feeds the material from a header to the inlet end of an auger on the forward end of the rotor, and a rotary beater, having a transverse axis is disposed between the delivery end of the endless elevator and the auger on the rotor, the beater operating at a higher tangential velocity than the feeder elevator to direct and accelerate the crop material along the sloping ramp beneath the beater for purposes of entraining the crop material in an arcuate, ribbon-like manner. It is to be noted that such beater requires additional power to operate the same, thereby adding somewhat to the complexity of the structure of the combine.

The present invention has been devised to provide very simple and highly effective means to solve the aforementioned problem of the formation of spiral, rope-like configurations induced by the changing of the longitudinal movement of the oncoming material to lateral movement effected by the rotation of the rotor and/or the auger on the forward end thereof, details of the invention being set forth in the following specification and illustrated in the accompanying drawings.

SUMMARY OF THE INVENTION

It is among the primary objects of the present invention to provide in an axial flow combine having a forward elevating conveyor by which crop material is fed in an axial direction to the leading or forward end of a rotor of the threshing mechanism and/or an auger on the forward end thereof which engages the longitudinally moving material and moves it laterally and spirally, divider means between the elevating means and the rotor end or auger, which minimizes the tendency for the aforementioned translation of movements of the material to form the same into somewhat spiral, rope-like configurations which tend to cause surging and bunching of the material while being threshed between rotor means and stationary concave means in axial flow combines.

It is another object of the invention to provide such divider means in the form of a vane extending generally longitudinally from the upper end of the elevating means to the forward end of the rotor and/or auger thereon, the upper edge of the vane being adjacent but spaced a limited distance from the path described by the forward end of the rotor and/or auger thereon, whereby the initial longitudinal movement of the material is somewhat prolonged by engagement with said longitudinally extending vane before the same is contacted by the rapidly moving rotating forward end of the rotor or auger thereon, such dividing of the material resulting in a part thereof being changed to lateral, spiral direction before the other divided part of the material is changed from longitudinal to lateral or spiral direction as it leaves the end of the vane, thereby spreading out the material and thus, minimizing the tendency for the same to be changed into a spiral, rope-like configuration.

A further object of the invention is to provide such vane in the form of an angle iron supported by a plate-like ramp extending between the upper end of the elevating conveyor and the forward end of the rotor, said ramp being parallel to either the forward end of the rotor or an auger on the forward end thereof, said ramp being spaced from the path described by the forward end of the rotor sufficiently to accommodate such vane and also space the edge thereof from said path.

It is still another object of the invention to provide an axial flow combine which has a pair of rotors respectively coacting with complementary concave grates in which the rotors rotate towards each other, as viewed from the top, and said rotors being provided on the forward ends thereof with augers beneath which the ramp commonly extends upwardly from the upper end of the elevating conveyor and beneath the augers for purposes of guiding the material to the augers and also support the aforementioned vanes which are mounted upon the ramp substantially in vertical alignment respectively with the axes of the rotors, the upper edges of the vanes being adjacent but spaced a limited distance below the path described by the flights of the augers.

Still another object of the invention is to form the vanes with forward portions substantially axially and parallel to the axes of the rotors, while the trailing or inner end portions of the vanes respectively extend at similar acute angles to the forward portions and in opposite directions away from each other.

A still further object of the invention is to provide conical augers which flare forwardly from the forward ends of the rotors and the ramp, as well as the upper edges of the dividing flanges being parallel to the path described by the flights of the conical augers.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENT

Figure 1:
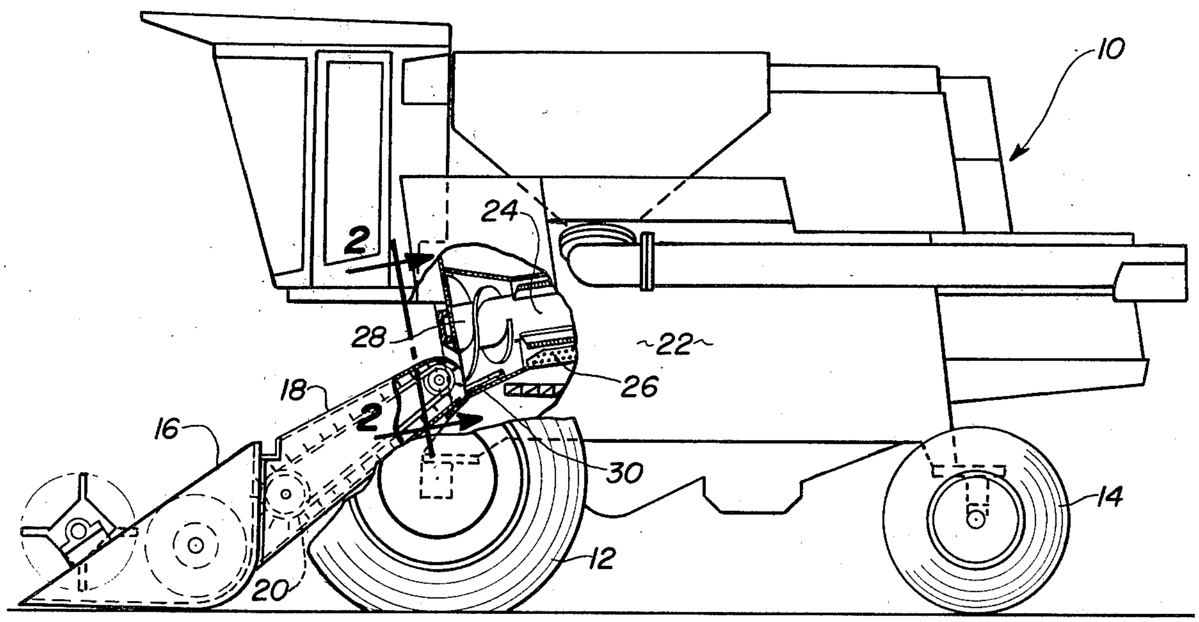
FIG. 1 is a side elevation of an exemplary combine embodying the principles of the present invention and broken away in the area thereof to which the present invention primarily pertains to illustrate internal elements of the invention.

Referring to FIG. 1, there is shown therein a typical combine 10 of a mobile type to which the present invention pertains. Said combine is supported by conventional wheels 12 and 14 and a header 16 supported on the forward end of the combine 10 for purposes of cutting and consolidating crop material for delivery to an elevator 18, having a housing which encloses an endless feed conveyor 20 of which the lower flight moves upwardly and rearwardly to the feeder house 22 in which pairs of coacting rotors 24 and concave grates 26 are fragmentarily illustrated in FIG. 1. Supported on the forward end of each rotor 24 is an auger 28, which, as specifically illustrated in FIGS. 1-4, is conical, said augers flaring outwardly and forwardly.

As best illustrated in side view in FIG. 1, there extends between the upper end of the elevator 18 and the forward end of the concave grate 26, a sheet-like ramp 30 which is parallel to the path described by the flights of the auger 28 but is spaced below the lower part of said path for purposes of supporting crop divider means comprising vanes 32, which preferably are formed from angle iron having vanes respectively at a right-angle to each other and including vertically extending flanges or ribs 34, and horizontal ribs 36, which are secured to the ramp 30 by any suitable means, such as rivets or bolts. Preferably, the vertical flanges or ribs 34 are in vertical alignment with the axes 38 of rotors 24, which are sometimes referred to herein as bearing rotors.

Figure 2:
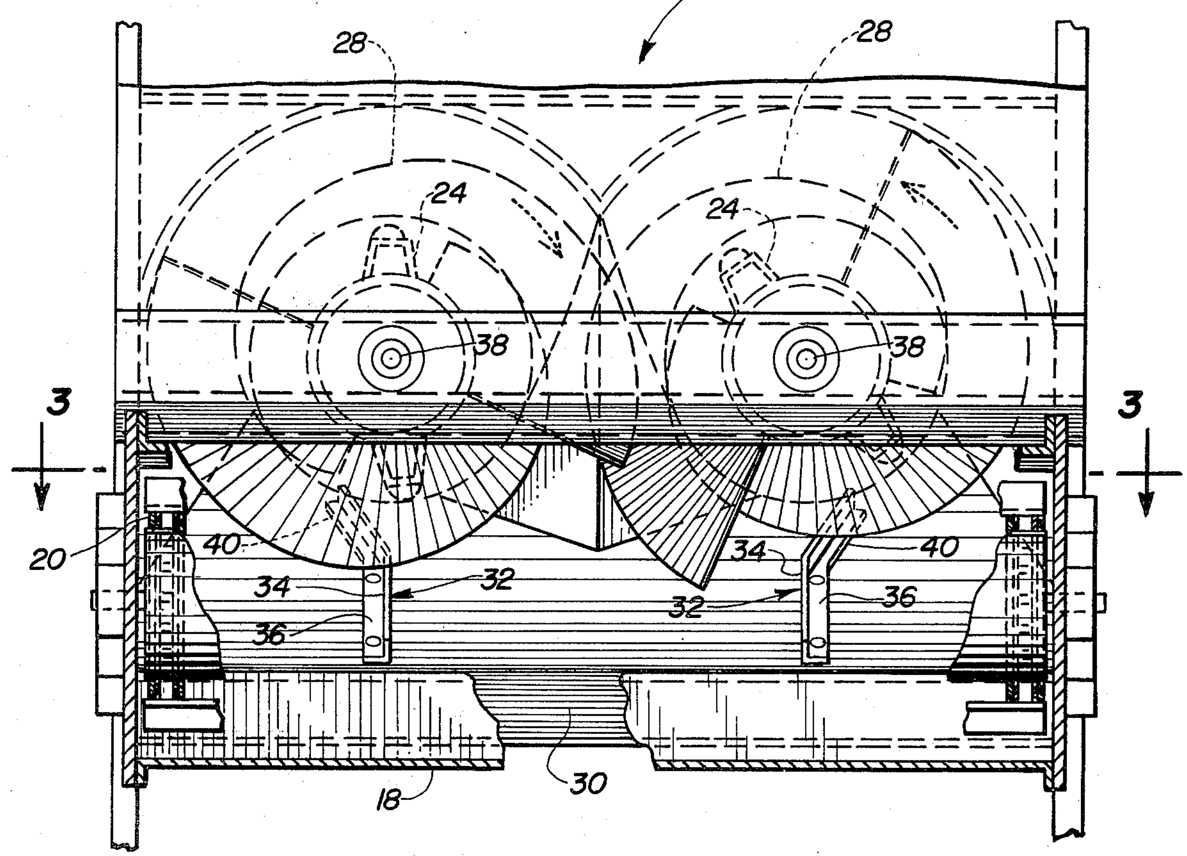
FIG. 2 is a fragmentary vertical front elevation of the infeed area of the combine, shown in FIG. 1, as seen on the line 2—2 thereof, and being illustrated on a substantially larger scale than in FIG. 1.
Figure 3:
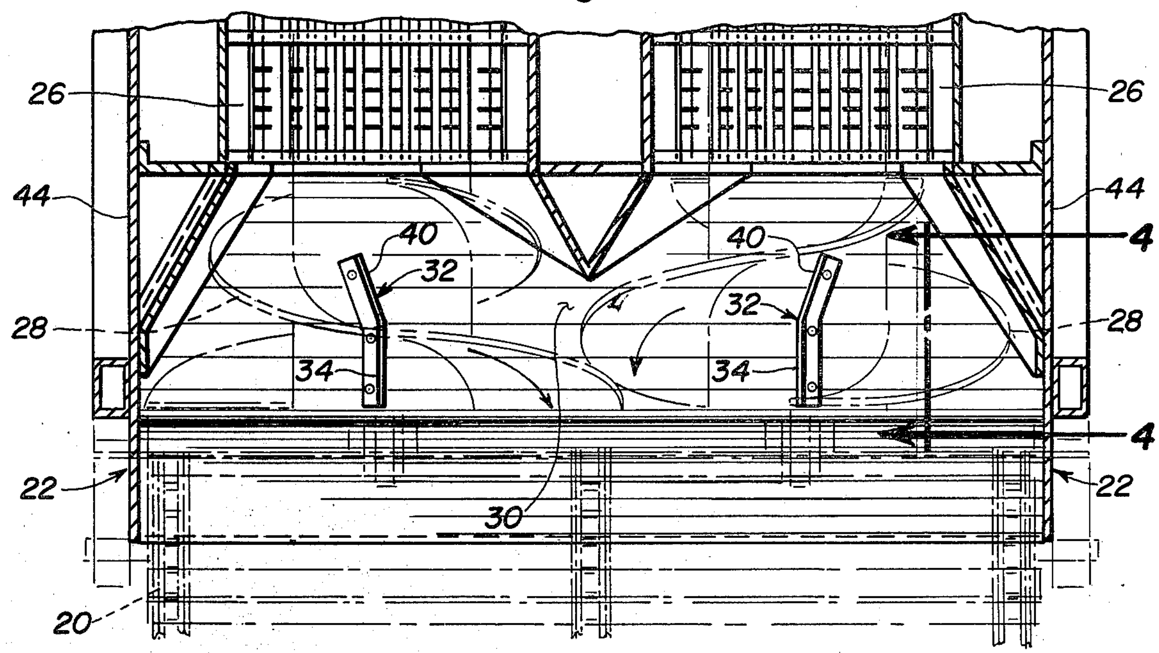
FIG. 3 is a horizontal sectional view, showing the top of the infeed ramp under the augers, illustrated in the preceding figures, said augers being illustrated in phantom, said view being taken on the line 3—3 of FIG. 2.

In the preferred embodiment of the invention, the divider vanes 32 preferably have two sections. These are best illustrated in FIGS. 2 and 3, and it will be seen from these figures that there is a forward portion which is parallel to the axes 38 of rotors 24 and a trailing or inner end portion 40 which extends at an acute angle to the forward portion. Also, as best seen from FIGS. 2 and 3, the preferred embodiment of the invention pertains to a combine in which a pair of coacting rotors and concaves are mounted in side-by-side relationship within the feeder house 22, said rotors being driven by power means, such as a diesel engine, not shown, supported within the housing of the combine 10 in accordance with conventional construction. The power means is connected to the rotors 24 in a manner to cause the same to rotate toward each other, as viewed from the top, as indicated by the phantom arrows, shown in FIG. 2. Similarly, the vanes 32 are provided in duplicate, one vane being for each rotor, beneath the auger 28 thereon and, as shown in FIGS. 2 and 3, the inner end portions 40 of the vanes 32 extend at angles away from each other in a rearward direction for purposes described below.

While vanes 32 are shown in the preferred embodiment with the vertical flange at a constant height, they can also be designed with a taper to the rear to further enhance the spreading action of the infeeding material as it is being changed to a circumferential path.

As can best be visualized from FIG. 1, material delivered from the header 16 by the feed conveyor 20 is moved in a longitudinal direction upwardly and rearwardly to the ramp 30 at a relatively slower speed than the peripheral speed of the augers 28. Hence, in normal operation of combines of this type, the longitudinal feed direction of the material is abruptly changed upon engagement by the auger 28 to a lateral or spiral path, and such action tends to form the material into spiral, rope-like configurations, which somewhat often resemble knotted masses, which, when engaged between the rotors 24 and concave grates 26, cause additional power consumption and actual burdens upon these elements incident to threshing the material between such coacting rotors and grates. The present invention tends to minimize such disadvantageous formation of the material as now will be described.

Figure 4:
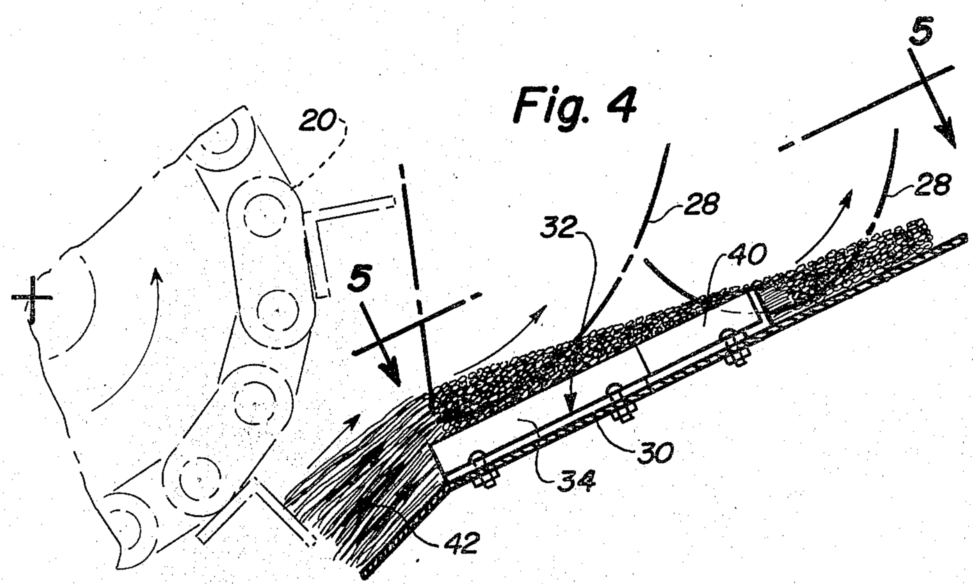
FIG. 4 is a fragmentary vertical sectional view, taken on the line 4—4 of FIG. 3, illustrating the nature of the material being fed between the fragmentarily illustrated elevating conveyor, shown in phantom, by the auger shown fragmentarily above the feed ramp.
Figure 5:
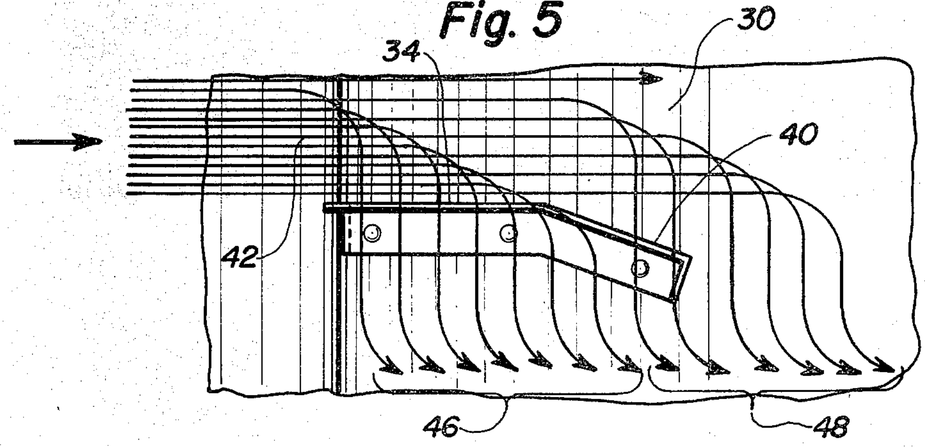
FIG. 5 is a schematic view, illustrating the diagram manner, the feeding flow of the material shown in FIG. 4, as seen on the line 5—5 thereof.

Referring to FIGS. 2-6, particularly FIG. 5, it will be seen that as the material 42, which is shown upon the ramp 30 in side elevation in FIG. 4 and in plan view in FIG. 5, said material is illustrated in FIG. 5 in the form of parallel lines. In FIG. 4, the material is being advanced by the feed conveyor 20 onto the ramp 30, where it is immediately engaged by the flights of the auger, which are fragmentarily shown by broken lines in FIG. 4. Due to the upstanding nature of the vanes 32 and the disposition of the same between the ramp 30 and the peripheries of the flights of the auger 28, said vanes will divide the oncoming material in a manner such that approximately half of it which is between the vanes and the outer sides 44 of the feeder house 22 or the immediate confining walls of the threshing chamber will be moved laterally and formed into spiral configurations before the other half of the material is so moved in view of the same being held in a longitudinal direction by the vanes 32, until said material, at least theoretically, emerges beyond the inner ends of the vanes, when it too will be moved laterally in the same spiral direction by the augers 28. Such a phenomenon is illustrated respectively by the different sets of arrows 46 and 48 in FIG. 5. As a result of this, the material 42 tends to be spread out into somewhat evenly divided layers, as distinguished from twisted and knotted rope-like configurations, which are delivered to the threshing elements comprising rotors 24 and concave grates 26.

It will be seen from the foregoing that the means for dividing the material to accomplish the desired results as explained above are very simple, rugged and capable of long life and require no servicing or consumption of additional power as is required, for example, in certain of the prior devices now in use, as referred to hereinabove.

The foregoing description illustrates preferred embodiments of the invention. However, concepts employed may, based upon such description be employed in other embodiments without departing from the scope of the invention. Accordingly, the following claims are intended to protect the invention broadly, as well as in the specific forms shown herein.

Having thus described the invention, what is claimed is:

1. An axial flow combine comprising a header having a material elevating conveyor extending upwardly and rearwardly to the forward end of a feeder house in which at least one rotor coacts with a concave grate to effect threshing of the material, an auger on the forward end of the rotor, and a stationary ramp beneath the auger to support the material for movement between the elevating conveyor and the auger and rotor and concave grate, in combination with vane means connected to said ramp beneath the auger and extending generally longitudinally of the feed path of material from said elevating conveyor to said auger and operable to divide the material and form the same somewhat into a partial layer moving longitudinally beneath the auger incident to the auger changing the direction of the material from longitudinal to lateral spiral directions for delivery of the material for threshing action by said rotor and concave grate.

2. The combine according to claim 1 in which said vane means includes a substantially vertical rib having an upper edge adjacent and substantially parallel to the path described by the tips of the flights of the auger.

3. The combine according to claim 2 in which said ramp also is substantially parallel to the path described by the tips of the flights of the auger and said vane means comprising angle iron members having one flange fixed to said ramp and the other flange comprising the vane.

4. The combine according to claim 2 in which said vane is substantially within a vertical plane extending through the axis of the rotor in the feeder house.

5. The combine according to claim 1 in which pairs of coacting rotors and concave grates are positioned side-by-side in said feeder housing and including drive means to rotate said rotors in opposite directions toward each other as viewed from the top thereof and further characterized by said ramp extending commonly beneath and between augers mounted on the forward ends of said rotors, and said ramp having fixed thereto a vane for each auger substantially and respectively in vertical alignment with the axes of said pair of rotors.

6. The combine according to claim 5 in which said vanes have forward portions extending axially with the axes of said rotors and trailing inner end portions integral with the forward portions thereof and respectively extending at similar acute angles to the forward portions in opposite directions away from each other.

7. The combine according to claim 5 in which said augers are conical and flare outwardly from the forward ends of said rotors, said ramp extending upwardly and rearwardly beneath said conical augers and is substantially parallel to the path described by the tips of the flights of said augers, and the upper edges of said vane means being adjacent said path of the tips of the flights of said augers and substantially parallel thereto.

* * * * *